United States Patent
Koike

[11] Patent Number: 5,982,556
[45] Date of Patent: Nov. 9, 1999

[54] OPTICAL SYSTEM AND LENS ELEMENT FOR VIEW FINDER

[75] Inventor: Kazumi Koike, Kanagawa, Japan

[73] Assignee: Fuji Photo Film Co., Ltd., Kanagawa, Japan

[21] Appl. No.: 09/107,454

[22] Filed: Jun. 30, 1998

[30] Foreign Application Priority Data

Jul. 1, 1997 [JP] Japan ................................ 9-175697

[51] Int. Cl.⁶ .............................. G02B 25/00; G02B 3/02; G02B 9/04
[52] U.S. Cl. ...................... 359/646; 359/643; 359/717; 359/744; 359/793; 396/382
[58] Field of Search ................... 359/643, 646, 359/744, 717, 793; 396/382

[56] References Cited

U.S. PATENT DOCUMENTS

| | | | |
|---|---|---|---|
| 2,234,716 | 3/1941 | Wood | 359/646 |
| 3,240,107 | 3/1966 | Prister, Jr. | 396/373 |
| 4,707,098 | 11/1987 | Wakamiya | 396/382 |
| 5,327,291 | 7/1994 | Baker et al. | 359/793 |
| 5,483,381 | 1/1996 | Baba | 359/744 |
| 5,508,848 | 4/1996 | Inoue | 359/793 |
| 5,587,844 | 12/1996 | Ohno | 359/646 |
| 5,739,965 | 4/1998 | Ohno | 359/793 |

*Primary Examiner*—Georgia Epps
*Assistant Examiner*—Evelyn A. Lester
*Attorney, Agent, or Firm*—Young & Thompson

[57] ABSTRACT

An optical system for a view finder reduced in the overall length without aggravation of the optical performance has a negative power object lens and a positive power eyepiece lens each of which has an asphrical surface at at least one side respectively. The negative power object lens having a concave object side lens surface is comprised of a rectangular-shaped solid lens base with its four corners cut away along periphery of the concave lens surface.

8 Claims, 14 Drawing Sheets

OPTICAL SYSTEM AND LENS ELEMENT FOR VIEW FINDER

BACKGROUND OF THE INVENTION

1. Field of the Invention

This invention relates to an optical system for a view finder and a lens element suitable for the view finder.

2. Description of Related Art

Inverted Galilean type of finder is well known as a view finder for cameras. It has a simple optical structure comprising two lens elements, namely an object lens having a negative refracting power and an eyepiece lens having a positive refracting power, and has a feature to be able to provide a large finder magnification by magnifying function of eyepiece lens and a wide field of view in spite of its simple optical structure. Therefore an inverted Galilean type of view finder is one of the most popular finders used for cameras, in particular, such as a low-cost 35 mm size lens shutter camera and a lens-fitted film unit, well known as a single-use or disposable camera, one of typical products of this kind having a taking lens with a focal length of about 32 mm and an angle of view of about 68 degrees.

Inverted Galilean type finder used in such a camera is usually 25.5 to 27.5 mm long in overall axial length of the optical system which refers a distance between an object side surface of the object lens and an image side surface of the eyepiece lens.

As plastic molding technology is developed, it has became possible to produce accurate light weight lenses with low costs on a large size. As known from, for example, Japanese Unexamined Patents Publications Nos. 50-87027 and 55-93116, and Japanese Patent Publications Nos. 61-40087 and 3-20732, inverted Galilean type finders have a distortion corrected up to about −4% by using an object lens with an aspherical surface formed on one of its sides.

Recently, an APS (Advanced Photo System) type cartridge has been introduced on the market. The cartridge has a function that a filmstrip entirely accommodated inside the cartridge before being loaded in the camera can be thrust out of the cartridge at need by rotating a spool of the cartridge in an unwinding direction. The APS filmstrip has a width of 24 mm and consequently a size of available image area for one shot is smaller than that of the conventional 35 mm size film. Moreover the size of an APS cartridge is lower in height and smaller in depth, which is always desirable to provide a camera with a depth much smaller as compared with using 35 mm type film because a shorter focal length taking lens can be employed.

In order to reduce the depth of camera, it is needed to incorporate not only a taking lens having a shorter focal length but a view finder having a shorter length. As is known from, for example, Japanese Unexamined Patent Publication No. 3-230276, an inverted Galilean type finder has a length between 20.43 and 20.63 mm. This fairly short length finder is realized by adopting an eyepiece lens of which one side is formed aspherical. However, the prior art finder is accompanied by aggravation of distortion increased up to −9%.

In the case where a concave lens having a strong curvature is formed on a rectangular plastic block, another problem arises as described below. In the inverted Galilean type finder, a finder magnification $\beta$ is given by the following expression (I), where f1 and f2 are focal lengths of an object lens and an eyepiece lens, respectively.

$$\beta = -f1/f2 \qquad \text{(I)}$$

The overall length of the finder optical system D is given by the following expression (II), $$D = f1 + f2 \qquad \text{(II)}$$

Derived from the above expressions (I) and (II), the overall length of the finder optical system D is expressed as follows:

$$D = f1 \times (1 - 1/\beta) \qquad \text{(III)}$$

It is found from the equation (III) that the smaller the focal length of the object lens f1 is, the shorter the overall length of the finder optical system becomes as long as the finder magnification $\beta$ remains constant.

A prior art rectangular block lens 5 as an object lens of a Galilean type view finder which is injection-molded, such as shown in FIGS. 25 and 26 by way of example, has a concave spherical lens surface 7 on the image side 6a of a rectangular-shaped solid lens base 6 having a plane face similar to an image area of the filmstrip. In order to make the focal length of the object lens 5 shorter, the concave spherical lens surface 7 must have a curvature sufficiently strong to provide a strong refracting power.

However, it brings, as shown in FIG. 26, the lens surface 7 is unavoidably increased in thickness Dp at the periphery in order to have a stronger curvature with the same effective radius Re while it has a strong curvature. As a result, the ratio of the peripheral thickness Dp to the central thickness Dc increases. In the plastic object lens 5 with the rectangular-shaped solid lens base 6, the volume of both side portions becomes much larger than that of the central portion of the lens. This will cause a substantial difference of a shrinkage of the injection-molded plastic resin between the side portions and the central portion and make the rectangular-shaped solid lens base 6 easy to produce a bend in the longitudinal direction, which makes it difficult to keep the lens surface 7 remain accurate.

There seems to be two ways to solve the problem that, while the ratio of the peripheral thickness Dp to the central thickness Dc is made closer to 1 (one), the aspect ratio of the rectangular-shaped solid lens base 6 is made closer to 1 (one). However to increase the central thickness Dc leads to a longer molding time which is always undesirable. In order for the rectangular-shaped solid lens base 6 to have an aspect ratio as close to 1 (one) as possible, it is necessary either to increase its height or to reduce its width. The former needs extra thick portions to upper and lower parts of the rectangular-shaped solid lens base 6 and results in having a larger size finder. The latter causes light reflection from the periphery of the lens to enter into a view which makes it hard for a user to see a subject clearly through the finder.

SUMMARY OF THE INVENTION

An object of the present invention is to provide an optical system to reduce the overall length of a view finder without making the optical performance worse.

Another object of the invention is to provide a lens element with a short focal length suitable for an optical system which prevents the accuracy of lens configuration from being made worse due to a shrinkage of plastic resin caused during injection molding.

According to the present invention, an optical system for view finders has an object lens and an eyepiece lens each of which has an aspherical surface at at least one of its sides. Moreover the eyepiece lens has a refracting power at the object side surface greater than at the image side surface. The aspherical surface at at least one side of the object lens restricts an increase in distortion to realize an image with a good quality at peripheral area. The aspherical surface at at least one side of the eyepiece lens restrains fluctuations of various types of aberrations to produce an image with a good quality at a central area. The greater refracting power the eyepiece lens at the object side than at the image side make it possible to restrict an increase in longitudinal chromatic aberration and coma aberration and to provide balanced aberrations. If the refracting power of the eyepiece lens at the object side is less than at the image side, coma aberration increases and it will be difficult to correct the coma aberration, even if the plastic materials of both object lens and eyepiece lens are the same.

According to the present invention, the object lens has a structure that a concave spherical lens surface is formed at the image side of a rectangular-shaped solid lens base of which four corners are cut away along the periphery of concave lens surface.

BRIEF DESCRIPTION OF THE DRAWINGS

The above and other objects and features are best understood from the following description directed various embodiments thereof when read in conjunction with the accompanying drawings, in which.

DETAILED DESCRIPTION OF THE EMBODIMENTS

In Figures showing aberration diagrams, curvature of field is scaled diopter and distortion is scaled %.

Figure 1:
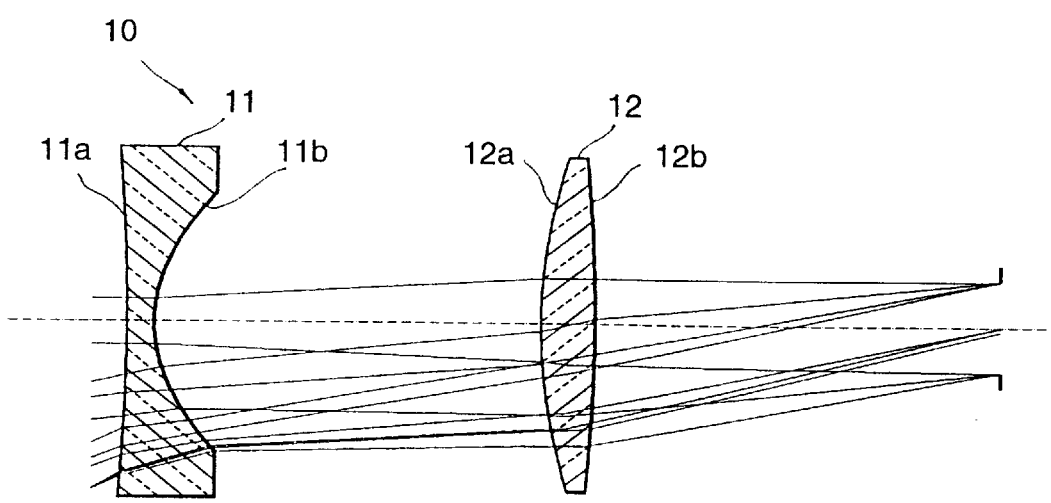
FIG. 1 is a schematic side view of an optical lens system of the invention together with optical paths of light fluxes.

FIG. 1 shows an optical system for an inverted Galilean type of view finder optical system of the invention together with the optical path of light fluxes at 4 mm of pupil diameter which is used in all examples described below. The optical system for an inverted Galilean type finder 10 is comprised of two lens elements arranged in order from the object side to the image side, namely a negative power object lens 11 and a positive power eyepiece lens 12. The object lens 11 has an image side 11b formed aspherical and the eyepiece lens 12, except for an optical lens system of example 10 set forth later, has an object side surface 12a formed aspherical. In the preferred embodiments, a refracting power of the eyepiece lens 12 is greater at the object side surface 12a than at the image side surface 12b. Various Examples for the optical system for the view finder of the present invention will be hereafter described. Throughout the description, characters are defined as follows:

T: the overall length in mm of an optical system for the inverted Galilean type view finder, which refers the distance between the object side surface 11a of the object lens 11 and an image side surface 12b of the eyepiece lens 12;

m: the magnification of an optical system for the inverted Galilean type view finder;

ω: a half of the angle of view in degrees;

I: the surface number defining the surface of a lens in order from the object side to image side;

R: the radius of curvature in mm of a lens

D: the distance between adjacent surfaces in mm; namely the lens thickness or the air distance;

N: the refractive index of a lens material

ν d: the dispersion measured by the Abbe number

P: the refracting power which is derived from the equation $Pi=(N(I)-N(I-1))/Ri$, wherein Pi is a refracting power of an surface of each lens, Ni is a refractive index of a surface of each lens and Ri is a radius of curvature of a surface of each lens;

P1: the refracting power calculated by assuming that Ni is 1.000 for I.

The aspherical surfaces used in each example described below satisfy the following expression:

$$Z = ch^2 / \left[1 + \sqrt{\{1-(1+K)c^2h^2\}}\right] + Ah^4 + Bh^6 + Ch^8 + Dh^{10}$$

where c represents the inverse of a radius of the paraxial curvature of the lens, h represents a view angle, K is a conic constant, and A, B, C and D are aspherical coefficients.

Every lateral aberration diagram shows the aberrations on the axis and at 70% height from the axis with 4 mm diameter of pupil, wherein a solid line represents the aberration regarding d-line and a broken line represents the aberration regarding g-line.

EXAMPLE I

Dimensions of the view finder optical lens system are as follows;

T=17.88
m=0.48
ω=29.83

The view finder optical lens system of Example I is substantially described in

TABLE 1

| Si | R | D | N | ν d | P |
|---|---|---|---|---|---|
| 1 | −106.918 | 1.000 | 1.492 | 57.5 | −0.0046 |
| 2 | 7.780 aspherical | 14.880 | 1.000 | | −0.0632 |
| 3 | 21.369 aspherical | 2.000 | 1.492 | 57.5 | 0.0230 |
| 4 | −51.148 | 1.000 | | | 0.0096 |

The aspherical coefficients are given in TABLE 2.

TABLE 2

| | Si | |
|---|---|---|
| | 2 | 3 |
| K | 0 | 0 |
| A | −2.5177E−04 | −2.4389E−05 |
| B | −2.0839E−06 | 1.3431E−06 |
| C | 3.8861E−08 | −1.2071E−08 |
| D | −1.4000E−09 | 0.0000E+00 |

Figure 2A:
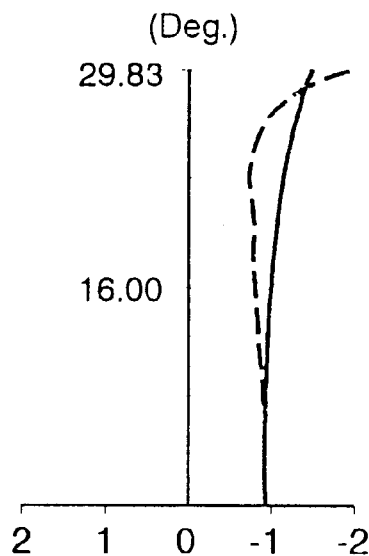
FIGS. 2A and 2B are aberration diagrams of showing curvature of field and distortion, respectively, of a view finder of an example I of the present invention.
Figure 2B:
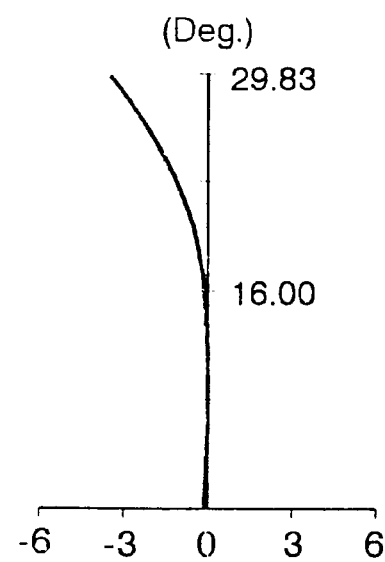
Figures 3A, 3B:
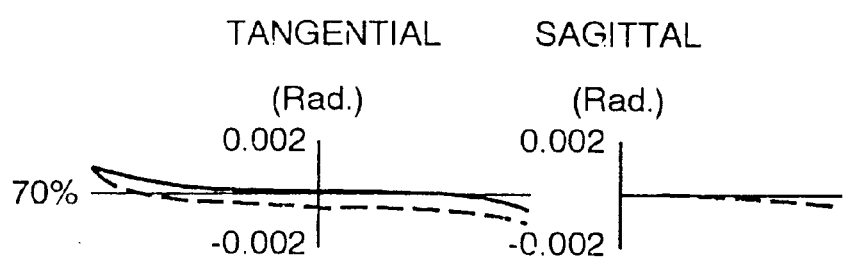
FIGS. 3A, 3B and 3C are lateral aberration diagrams of the view finder of the example I of the present invention.
Figure 3C:
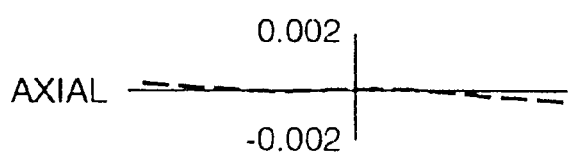
Figure 4A:
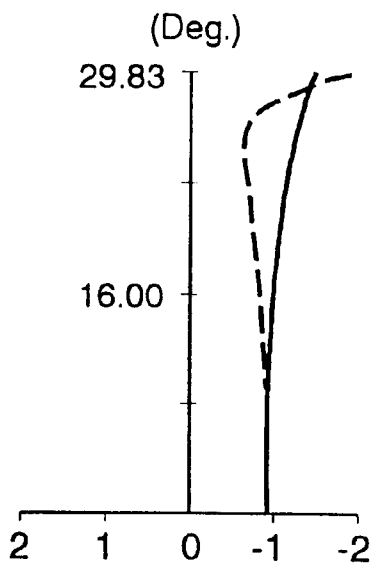
FIGS. 4A and 4B are aberration diagrams of showing, curvature of field and distortion, respectively, of a view finder of an example II of the present invention.
Figure 4B:
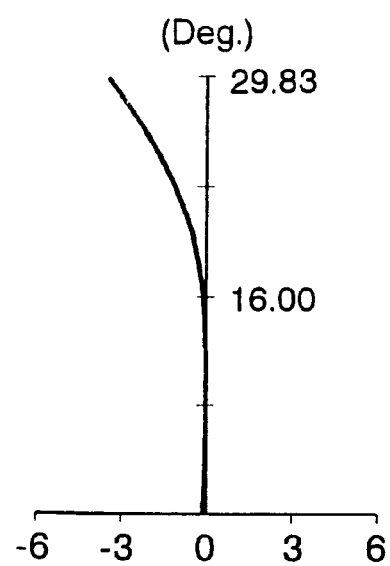
Figures 5A, 5B:
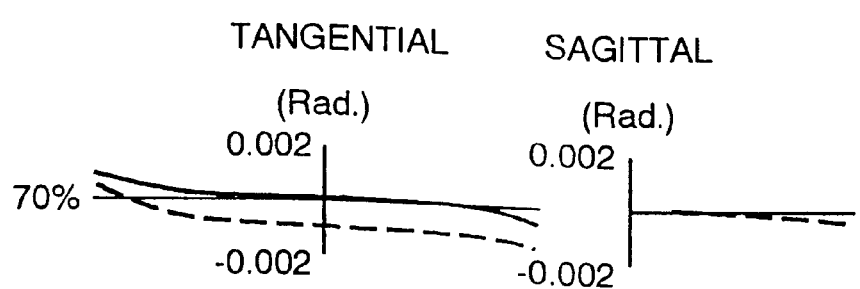
FIGS. 5A, 5B and 5C lateral aberration diagrams of the view finder of the example II of the present invention.
Figure 5C:
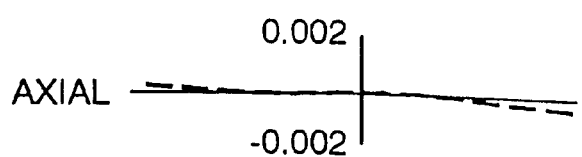
Figure 6A:
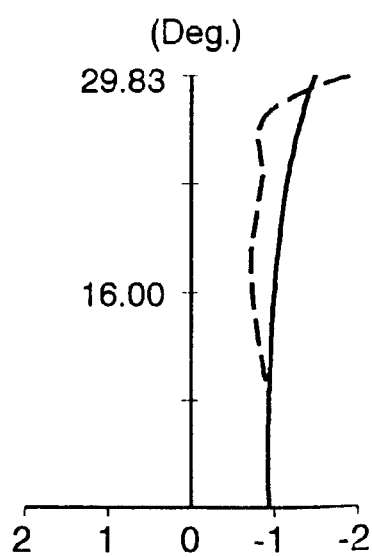
FIGS. 6A and 6B are aberration diagrams of showing curvature of field and distortion, respectively, of a view finder of an example III of the present invention.
Figure 6B:
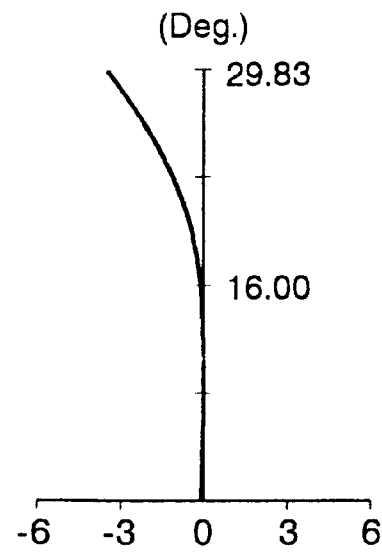
Figures 7A, 7B:
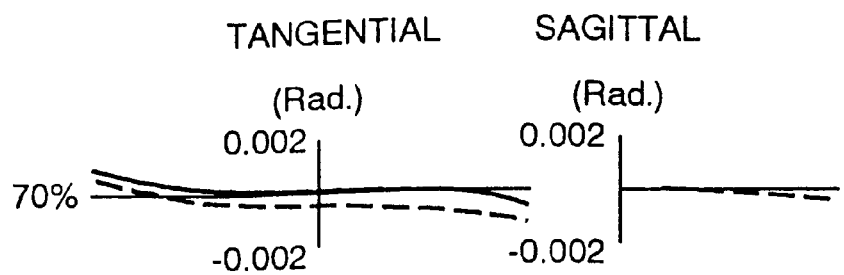
FIGS. 7A, 7B and 7C lateral aberration diagrams of the view finder of the example III of the present invention.
Figure 7C:
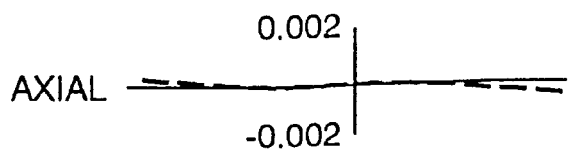
Figure 8A:
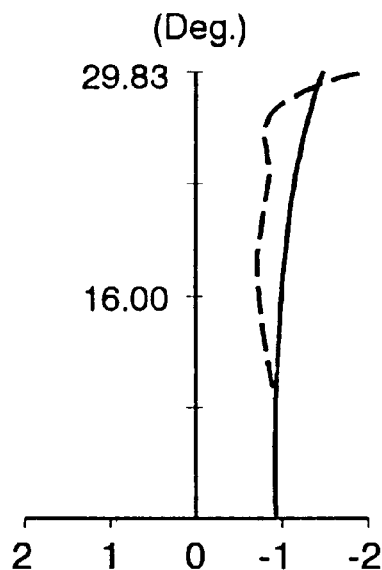
FIGS. 8A and 8B are aberration diagrams of showing curvature of field and distortion, respectively, of a view finder of an example IV of the present invention.
Figure 8B:
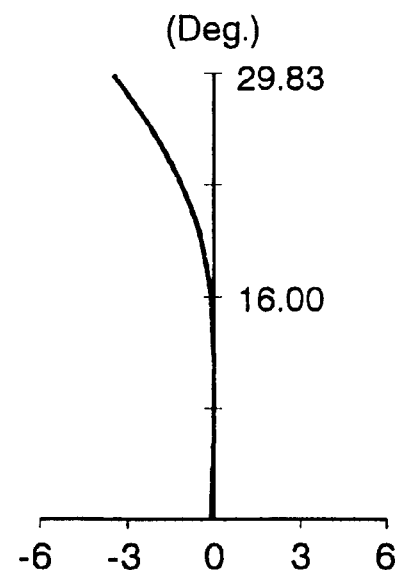
Figures 9A, 9B:
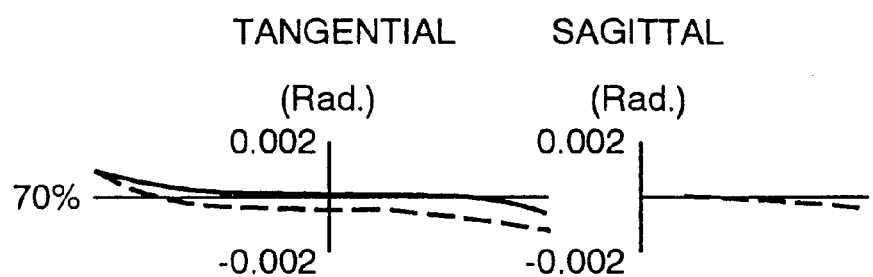
FIGS. 9A, 9B and 9C lateral aberration diagrams of the view finder of the example IV of the present invention.
Figure 9C:
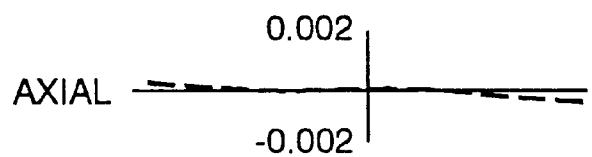
Figure 10A:
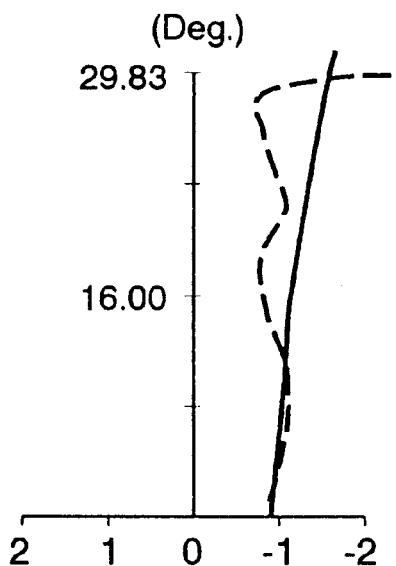
FIGS. 10A and 10B are aberration diagrams of showing curvature of field and distortion, respectively, of a view finder of an example V of the present invention.
Figure 10B:
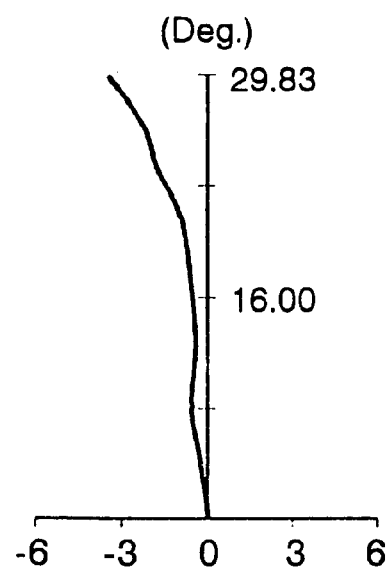
Figures 11A, 11B:
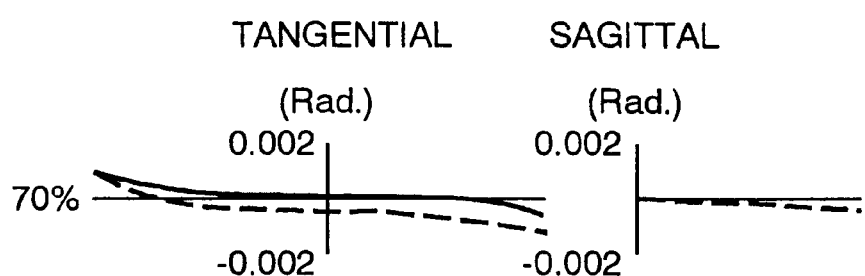
FIGS. 11A, 11B and 11C lateral aberration diagrams of the view finder of the example V of the present invention.
Figure 11C:
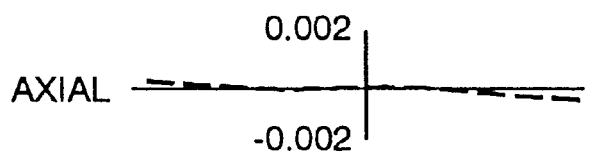
Figure 12A:
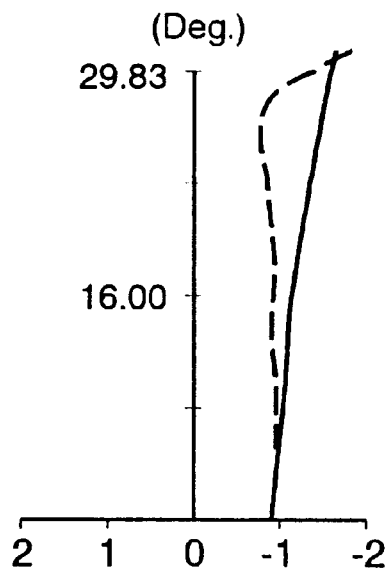
FIG. 12A and 12B are aberration diagrams of showing curvature of field and distortion, respectively, of a view finder of an example VI of the present invention.
Figure 12B:
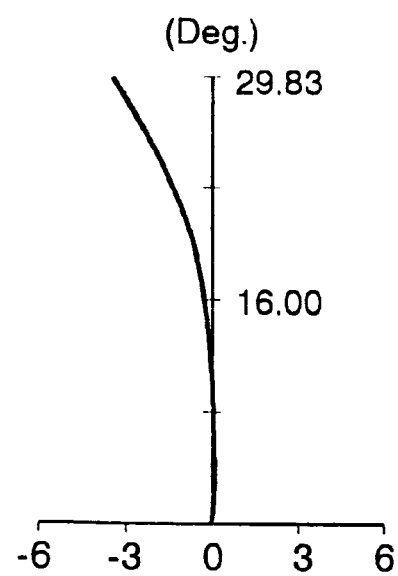
Figures 13A, 13B:
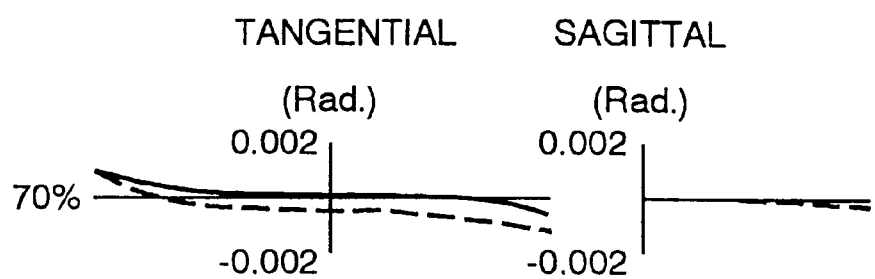
FIGS. 13A, 13B and 13C lateral aberration diagrams of the view finder of the example VI of the present invention.
Figure 13C:
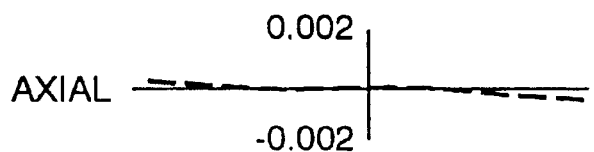
Figure 14A:
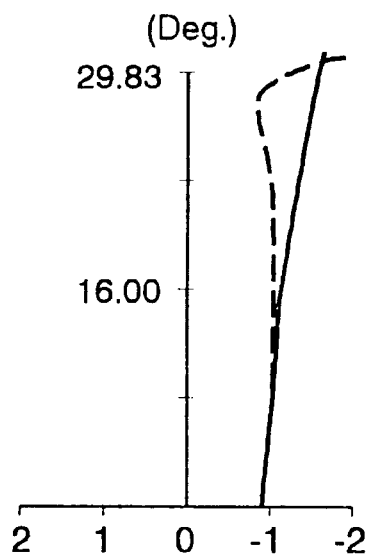
FIG. 14A and 14B are aberration diagrams of showing curvature of field and distortion, respectively, of a view finder of an example VII of the present invention.
Figure 14B:
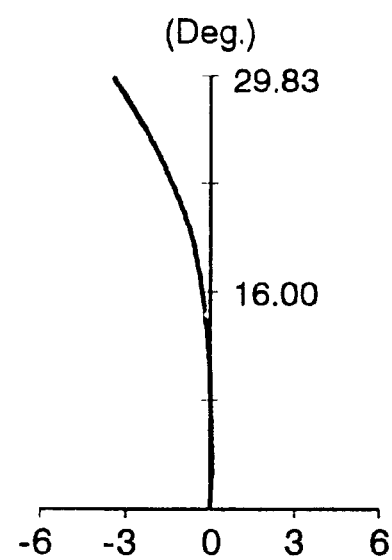
Figures 15A, 15B:
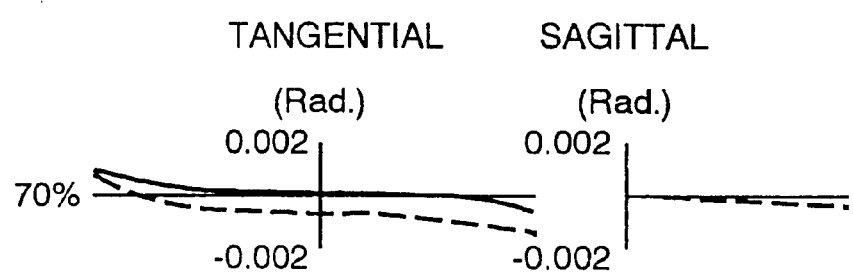
FIGS. 15A, 15B and 15C lateral aberration diagrams of the view finder of the example VII of the present invention.
Figure 15C:
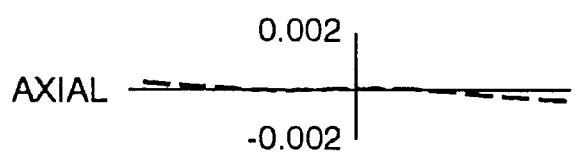
Figure 16A:
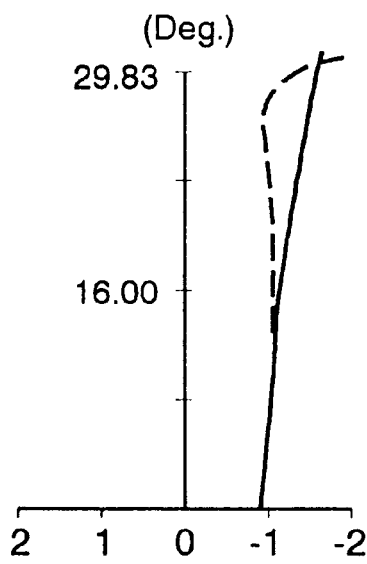
FIGS. 16A and 16B are aberration diagrams of showing curvature of field and distortion, respectively, of a view finder of an example VIII of the present invention.
Figure 16B:
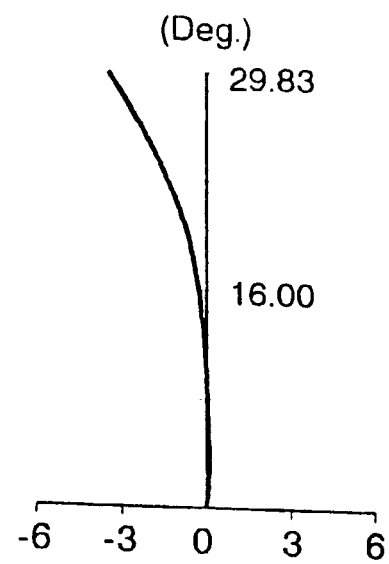
Figures 17A, 17B:
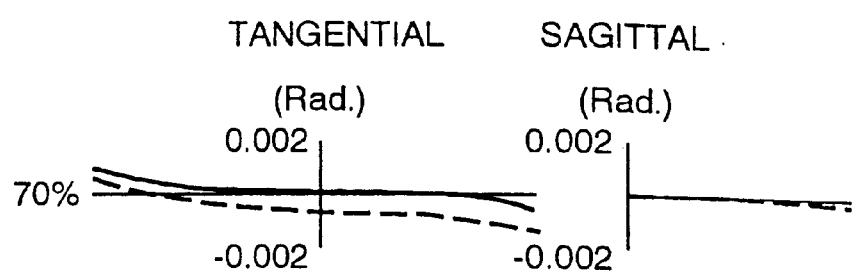
FIGS. 17A, 17B and 17C lateral aberration diagrams of the view finder of the example VIII of the present invention.
Figure 17C:
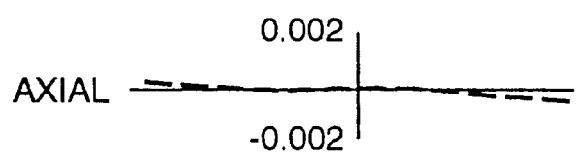
Figure 18A:
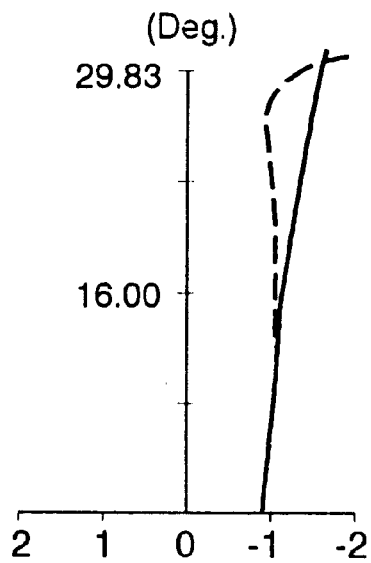
FIGS. 18A and 18B are aberration diagrams of showing curvature of field and distortion, respectively, of a view finder of an example IX of the present invention.
Figure 18B:
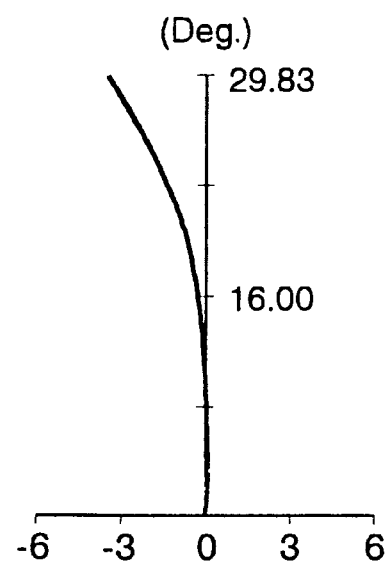
Figures 19A, 19B:
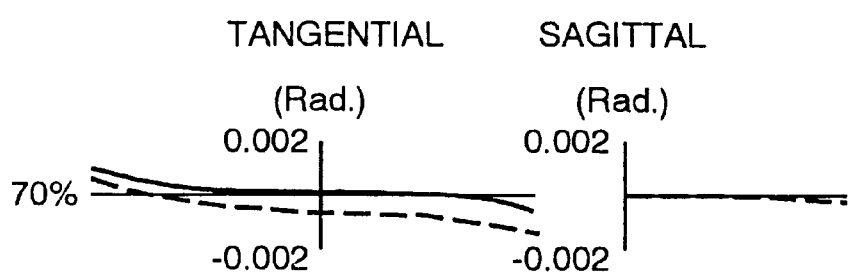
FIGS. 19A, 19B and 19C lateral aberration diagrams of the view finder of the example IX of the present invention.
Figure 19C:
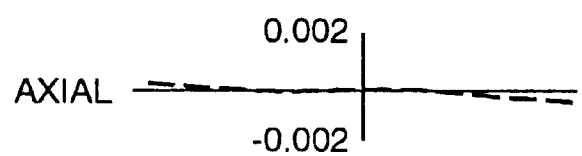
Figure 20A:
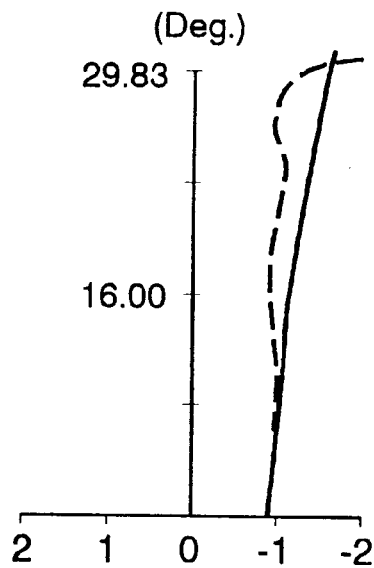
FIGS. 20A and 20B are aberration diagrams of showing curvature of field and distortion, respectively, of a view finder of an example X of the present invention.
Figure 20B:
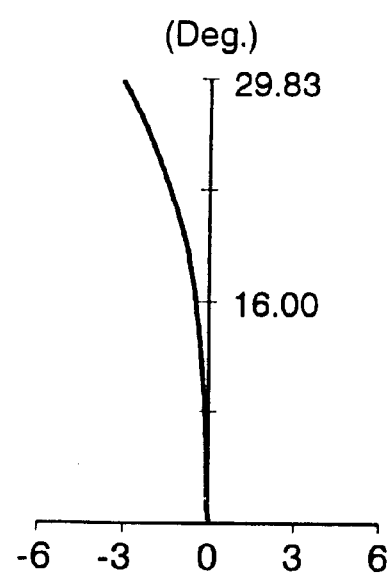
Figures 21A, 21B:
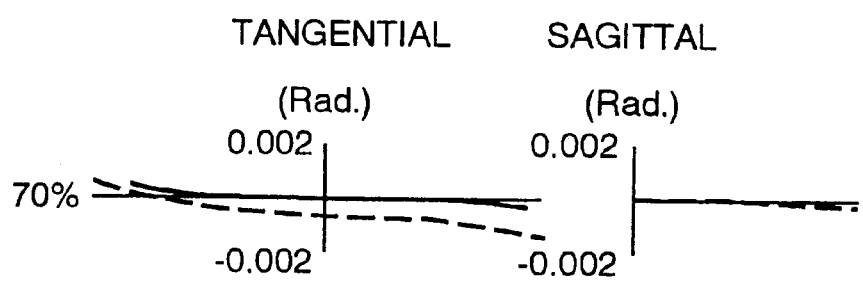
FIGS. 21A, 21B and 21C lateral aberration diagrams of the view finder of the example X of the present invention.
Figure 21C:
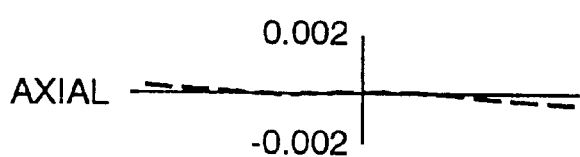

FIGS. 2A and 2B show, respectively, a curvature of field in a sagittal image plane indicated by S and in a tangential image plane indicated by T, and a distortion. FIGS. 3A, 3B and 3C show a lateral aberration.

EXAMPLE II

Dimensions of the view finder optical lens system of Example II are as follows;

T=19.58
m=0.48
ω=29.83

The view finder optical lens system of Example If is substantially described in TABLE 3 and the aspherical coefficients are given in TABLE 4.

TABLE 3

| Si | R | D | N | ν d | P |
|---|---|---|---|---|---|
| 1 | ∞ | 1.000 | 1.492 | 57.5 | 0.0000 |
| 2 | 7.975 aspherical | 16.580 | 1.000 | | −0.0617 |
| 3 | 23.076 aspherical | 2.000 | 1.492 | 57.5 | 0.0213 |
| 4 | −60.703 | 1.000 | | | 0.0081 |

TABLE 4

| | Si | |
|---|---|---|
| | 2 | 3 |
| K | 0 | 0 |
| A | −1.8033E−04 | −1.5857E−05 |
| B | −2.1198E−06 | 1.7407E−06 |
| C | 3.5855E−08 | −1.9390E−08 |
| D | −1.0962E−09 | 0.0000E+00 |

EXAMPLE III

Dimensions of the view finder optical lens system of Example III are as follows;

T=18.10
m=0.48
ω=29.83

The view finder optical lens system of Example III is substantially described in TABLE 3 and the aspherical coefficients are given in TABLE 4.

TABLE 5

| Si | R | D | N | ν d | P |
|---|---|---|---|---|---|
| 1 | ∞ | 1.000 | 1.492 | 57.5 | 0.0000 |
| 2 | 1.423 aspherical | 15.100 | 1.000 | | −0.0663 |
| 3 | 29.118 aspherical | 2.000 | 1.492 | 57.5 | 0.0169 |
| 4 | −32.969 | 1.000 | | | 0.0149 |

TABLE 6

| | Si | |
|---|---|---|
| | 2 | 3 |
| K | 0 | 0 |
| A | −1.9185E−04 | −1.8901E−07 |
| B | −4.4816E−06 | 1.0950E−06 |
| C | 1.1306E−07 | −7.2268E−09 |
| D | −2.8110E−09 | 0.0000E+00 |

EXAMPLE IV

Dimensions of the view finder optical lens system of Example IV are as follows;

T=18.12
m=0.48
ω=29.83

The view finder optical lens system of Example IV is described in TABLE 7 and the aspherical coefficients are given shown in TABLE 8.

TABLE 7

| Si | R | D | N | ν d | P |
|---|---|---|---|---|---|
| 1 | ∞ | 1.000 | 1.492 | 57.5 | 0.0000 |
| 2 | 7.458 aspherical | 15.220 | 1.000 | | −0.0660 |
| 3 | 28.839 aspherical | 1.900 | 1.492 | 57.5 | 0.0171 |
| 4 | −33.742 | 1.000 | | | 0.0146 |

TABLE 8

| | Si | |
|---|---|---|
| | 2 | 3 |
| K | 0 | 0 |
| A | −1.9247E−04 | −9.9093E−07 |
| B | −4.1645E−06 | 1.1198E−06 |
| C | 1.0255E−07 | −7.6976E−09 |
| D | −2.6139E−09 | 0.0000E+00 |

EXAMPLE V

Dimensions of the view finder optical lens system of Example V are as follows;

T=18.129
m=0.48
ω=29.83

The view finder optical lens system of Example V is substantially described in TABLE 9 and the aspherical coefficients are given in TABLE 10.

TABLE 9

| Si | R | D | N | ν d | P |
|---|---|---|---|---|---|
| 1 | 456.416 | 1.000 | 1.492 | 57.5 | 0.0011 |
| 2 | 7.327 aspherical | 15.129 | 1.000 | | −0.0672 |
| 3 | 30.122 aspherical | 2.000 | 1.492 | 57.5 | 0.0163 |
| 4 | −31.988 | 1.000 | | | 0.0154 |

TABLE 10

| | Si | |
|---|---|---|
| | 2 | 3 |
| K | 0 | 0 |
| A | −1.3348E−04 | −9.8476E−06 |
| B | −1.0093E−05 | 1.6042E−06 |
| C | 2.9785E−07 | −1.3970E−08 |
| D | −5.1073E−09 | 0.0000E+00 |

EXAMPLE VI

Dimensions of the view finder optical lens system of Example VI are as follows;

T=17.88
m=0.514
ω=29.83

The view finder optical lens system of Example VI is substantially described in TABLE 11 and the aspherical coefficients are given in TABLE 12.

TABLE 11

| Si | R | D | N | ν d | P |
|---|---|---|---|---|---|
| 1 | ∞ | 1.000 | 1.492 | 57.5 | 0.0000 |
| 2 | 8.312 aspherical | 16.580 | 1.000 | | −0.0617 |
| 3 | 25.095 aspherical | 2.000 | 1.492 | 57.5 | 0.0196 |
| 4 | −45.900 | 1.000 | | | 0.0107 |

TABLE 12

| | Si | |
|---|---|---|
| | 2 | 3 |
| K | 0 | 0 |
| A | −1.4200E−04 | −4.2564E−06 |
| B | −1.6608E−06 | 1.0270E−06 |
| C | 2.8830E−08 | −8.3235E−09 |
| D | −7.9624E−10 | 0.0000E+00 |

EXAMPLE VII

Dimensions of the view finder optical lens system of Example VII are as follows;

T=17.88
m=0.52
ω=29.83

The view finder optical lens system of Example VII is substantially described in TABLE 13 and the aspherical coefficients are given in TABLE 14.

TABLE 13

| Si | R | D | N | ν d | P |
|---|---|---|---|---|---|
| 1 | ∞ | 1.000 | 1.492 | 57.5 | 0.0000 |
| 2 | 8.470 aspherical | 14.880 | 1.000 | | −0.0581 |
| 3 | 24.971 aspherical | 2.000 | 1.492 | 57.5 | 0.0197 |
| 4 | −47.674 | 1.000 | | | 0.0103 |

TABLE 14

| | Si | |
|---|---|---|
| | 2 | 3 |
| K | 0 | 0 |
| A | −1.3660B−04 | −4.8733E−06 |
| B | −1.3307E−06 | 1.0016E−06 |
| C | 2.1154E−08 | −8.0058E−09 |
| D | −6.3062E−09 | 0.0000E+00 |

EXAMPLE VIII

Dimensions of the view finder optical lens system of Example VIII are as follows;

T=17.88
m=0.53
ω=29.83

The view finder optical lens system of Example VIII is substantially described in TABLE 15 and the aspherical coefficients are given in TABLE 16.

TABLE 15

| Si | R | D | N | ν d | P |
|---|---|---|---|---|---|
| 1 | ∞ | 1.000 | 1.492 | 57.5 | 0.0000 |
| 2 | 8.742 aspherical | 14.880 | 1.000 | | -0.0563 |
| 3 | 22.292 aspherical | 2.000 | 1.492 | 57.5 | 0.0221 |
| 4 | -65.595 | | 1.000 | | 0.0075 |

TABLE 16

| | Si | |
|---|---|---|
| | 2 | 3 |
| K | 0 | 0 |
| A | -1.3228E-04 | -1.1410E-05 |
| B | -1.2774E-06 | 9.7954E-07 |
| C | 2.0070E-08 | -7.8372E-09 |
| D | -5.0471E-10 | 0.0000E+00 |

EXAMPLE IX

Dimensions of the view finder optical lens system of Example IX are as follows;

T=18.12
m=0.54
ω=29.83

The view finder optical lens system of Example IX is substantially described in TABLE 17 and the aspherical coefficients are given in TABLE 18.

TABLE 17

| Si | R | D | N | ν d | P |
|---|---|---|---|---|---|
| 1 | ∞ | 1.000 | 1.492 | 57.5 | 0.0000 |
| 2 | 9.193 aspherical | 15.120 | 1.000 | | -0.0535 |
| 3 | 21.497 aspherical | 2.000 | 1.492 | 57.5 | 0.0229 |
| 4 | -86.732 | | 1.000 | | 0.0057 |

TABLE 18

| | Si | |
|---|---|---|
| | 2 | 3 |
| K | 0 | 0 |
| A | -1.2002E-04 | 1.4299E-05 |
| B | -7.3636E-07 | 9.4688E-07 |
| C | 8.7704E-09 | -7.6869E-09 |
| D | -2.7476E-10 | 0.0000E+00 |

EXAMPLE X

In the view finder optical lens system of Example X, the eyepiece lens 12 is formed aspherical not on the object side surface 12a but on the image side surface 12b unlikely from other Examples described above.

Dimensions of the view finder optical lens system of Example X are as follows;

T=18.12
m=0.48
ω=29.83

The view finder optical lens system of Example X is substantially described in TABLE 19 and the aspherical coefficients are given in TABLE 20.

TABLE 19

| Si | R | D | N | ν d | P |
|---|---|---|---|---|---|
| 1 | -252.119 | 1.000 | 1.492 | 57.5 | -0.0020 |
| 2 | 7.79 aspherical | 15.120 | 1.000 | | -0.0649 |
| 3 | 22.562 | 2.000 | 1.492 | 57.5 | 0.0218 |
| 4 | -47.730 aspherical | | 1.000 | | 0.0103 |

TABLE 20

| | Si | |
|---|---|---|
| | 2 | 3 |
| K | 0 | 0 |
| A | -1.8109E-04 | 1.0025E-05 |
| B | -6.0616E-06 | -1.0195E-06 |
| C | 1.4165E-07 | 9.4953E-09 |
| D | -2.7927E-09 | 0.0000E+00 |

Figure 22:
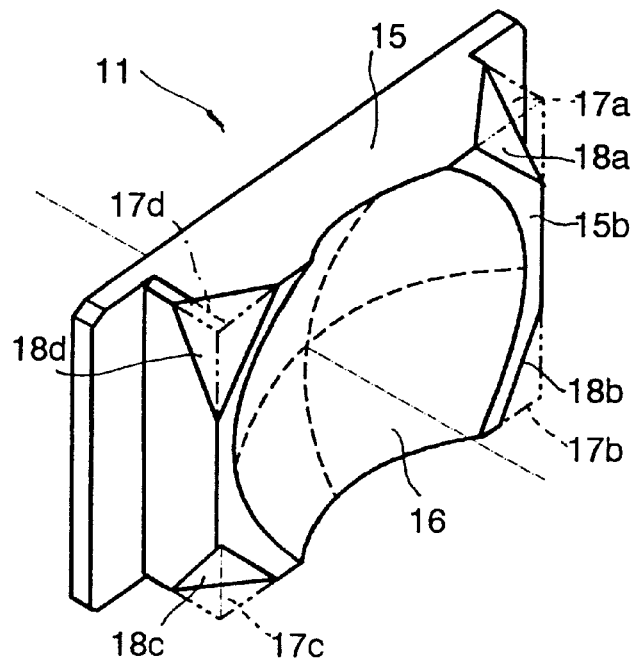
FIG. 22 is a perspective view of a lens element in accordance with an embodiment of the present invention.

FIG. 22 shows a lens element with a strong concave curvature, which is made by plastic molding and preferably applied as an object lens of the view finder optical system of the invention.

An object lens 11 has a concave spherical surface 16 formed at the image side 15b of a rectangular-shaped solid lens base 15 of which four corners 17a, 17b, 17c and 17d at the image side 15b are cut away respectively along the periphery of the concave lens surface 16. Numerals 18a, 18b 18c and 18d denote the cut away portions which form approximately triangle surfaces by removing trigonal pyramidal pieces.

Figure 23:
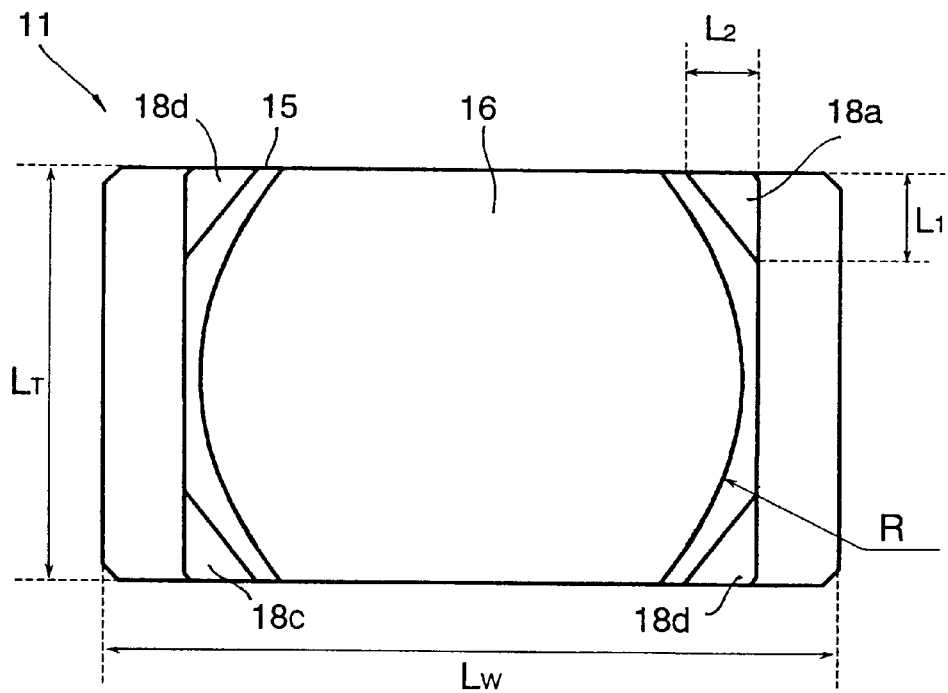
FIG. 23 is a front view as viewed from the image side of the lens element illustrated in FIG. 22.
Figure 24:
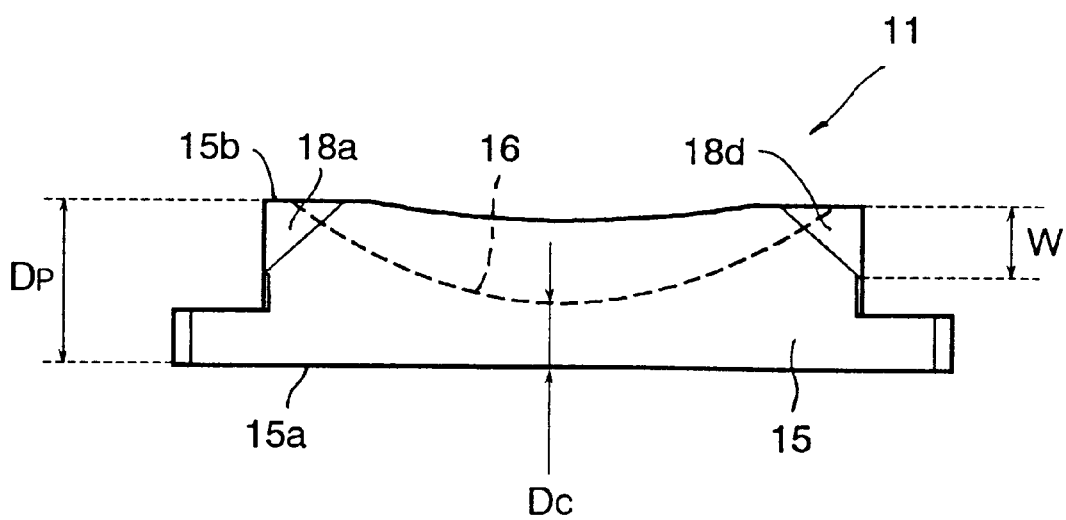
FIG. 24 is a top plan view of the lens element illustrated in FIG. 22.
Figure 25:
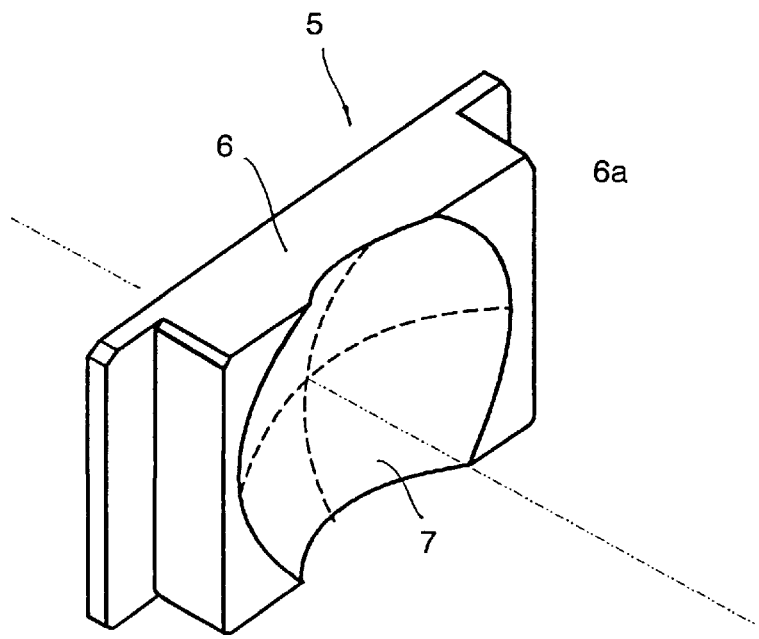
FIG. 25 is a perspective view of a prior art lens element.
Figure 26:
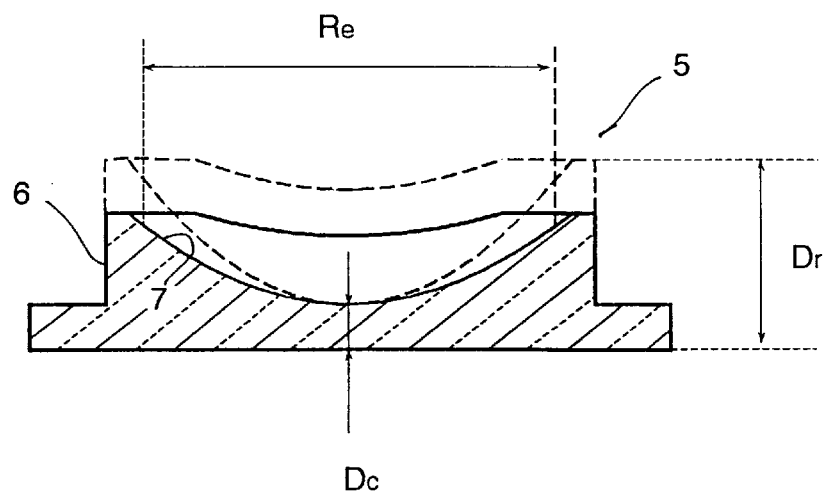
FIG. 26 is a cross-sectional view of the lens element illustrated in FIG. 25.

In FIGS. 23 and 24, a height Lr and a width Lw of the lens base 15 are respectively measured 9.50 mm and 17.00 mm. A radius of curvature of the lens surface 16 is measured 6.00 mm, a central thickness Dc of the lens is measured 1.25 mm and a maximum peripheral thickness of the lens is measured 3.85 mm. Four corners 17a, 17b, 17c and 17d are cut away respectively by 2.44 mm in height (L1), 1.76 mm in width (L2) and 1.73 mm in depth (W).

In this example, a ratio P of the peripheral thickness Dp to the central thickness Dc amounts to about 3.08.

$$P = Dp/Dc = 3.85/1.25 \approx 3.08$$

This value seems too large to form a quite accurate injection molded plastic lens integral with a rectangular-shaped solid lens base. This is because the volume of both side portions becomes much larger than that of the central portion of the lens which will cause a substantial difference of a shrinkage of the plastic resin block after injection-molding between the side portions and the central portion to form a bend of the lens in the longitudinal direction. However, since the object lens 11 has reduced the volume of its both side portions of the lens surface 16 symmetrically by cutting away four corners 17a, 17b, 17c and 17d of the rectangular-shaped solid lens base 15, a volumetric ratio in the transverse direction has become smaller than the ratio P. This helps to reduce the difference of the shrinkage and prevents a bend of the lens in the longitudinal width direction. The cutting away four corners also provides good mold releasing because the surfaces of the cut away portions 18a, 18b 18c and 18d form slopes. Thus the object lens 11 is given a curvature sufficiently strong to have a significant short focal length with an enough accurate shape.

Ten sample lenses S1 to S10 of this invention, which had the shape shown in FIGS. 23–24 and were injection-molded, were examined as to whether they produce a bend and shrinks or not. A reduced amount of the volume Q by cutting away four corners was about 4.95 mm$^3$.

$$Q=[\{(2.44 \times 1.76/2) \times 1.73\}/3] \times 4 \approx 4.95 \text{ mm}^3$$

As comparative samples, five prior art sample lenses CS1 to CS5 with any corners remaining as molded were prepared. Except for not-cutout portion, all the dimensions of the comparative sample lens CS1–CS5 were the same as the comparative sample lens S1–S10, namely the radius of curvature of the lens surface 16 was 6.00 mm, the central thickness Dc was 1.25 mm and the maximum peripheral thickness was 3.85 mm.

From the result of the comparison, it is found that the sample lens S1 to S10 have no deformation of the lens surface while the comparative sample lenses CS1 to CS5 with no cutout have a deformation on the lens surface.

As set forth above, the aspherical surface at at least one side of the object lens restricts an increase of distortion to realize a good quality of peripheral image and the aspherical surface at at least one side of the eyepiece lens restrains fluctuations of various types of aberrations to provide a good quality of image at central area. The greater refracting power of the eyepiece lens at its object side than at the image side makes it possible to restrict aggravation of longitudinal chromatic aberration and coma aberration and to provide favorably balanced aberrations while establishing the shorter overall length of the view finder optical lens system suitable for making a camera depth thinner. Also a lens element having a strong refracting power as well as a high accuracy, which is always necessary to have a compact overall length of the view finder, is accomplished by the invention.

What is claimed is:

1. An optical lens system for an inverted Galilean type of view finder for a camera, said optical lens system comprising:

a negative power object lens having an object side surface and an image side surface at least one of which is aspherical; and a positive eyepiece lens having an object side surface and an image side surface at least one of which is aspherical, said object side surface having a refracting power greater than said image side surface;

wherein said object lens comprises:

a rectangular-shaped solid base; and a concave lens surface formed on said rectangular-shaped solid lens base at an image side thereof;

wherein said rectangular-shaped solid base at said object side has four corners cut away along a periphery of said concave lens surface.

2. The optical lens system for an inverted Galilean type of view finder as claimed in claim 1, wherein said object side surface of said positive power eyepiece lens has refracting power ranging between 0.0163 and 0.0230 and said image side surface of said eyepiece lens has refracting power ranging between 0.0057 and 0.0154.

3. The optical lens system for an inverted Galilean type of view finder as claimed in claim 1, wherein said object side surface of said negative power object lens has a refracting power ranging between −0.0046 and 0.0011 and said image side surface of said object lens has a refracting power ranging between −0.0672 and −0.0535.

4. An optical lens system for an inverted Galilean type of view finder, comprising a positive power eyepiece lens and a negative power object lens in order from an image side to an object side, said negative power object lens comprising:

a rectangular-shaped solid base made of a plastic; and a concave lens surface formed on said rectangular-shaped solid lens base at an image side of said optical lens system;

said rectangular-shaped solid base at said image side four corners cut away along periphery of said concave lens surface.

5. The optical system for an inverted Galilean type of view finder as claimed in claim 4, wherein said concave lens surface is aspherical.

6. The optical system for an inverted Galilean type of view finder as claimed in claim 4, wherein said concave lens surface is spherical.

7. The optical system for an inverted Galilean type of view finder as claimed in claim 4, wherein said positive power eyepiece has at least one aspherical surface.

8. A plastic lens element for an optical lens system, comprising:

a rectangular-shaped solid base; and a concave lens surface formed on said rectangular-shaped solid lens base at an image side thereof;

said rectangular-shaped solid base at said image side has four corners cut away along periphery of said concave lens surface.

* * * * *